R. J. ALTGELT.
PLANTER.
APPLICATION FILED FEB. 26, 1915.
1,233,010.
Patented July 10, 1917.
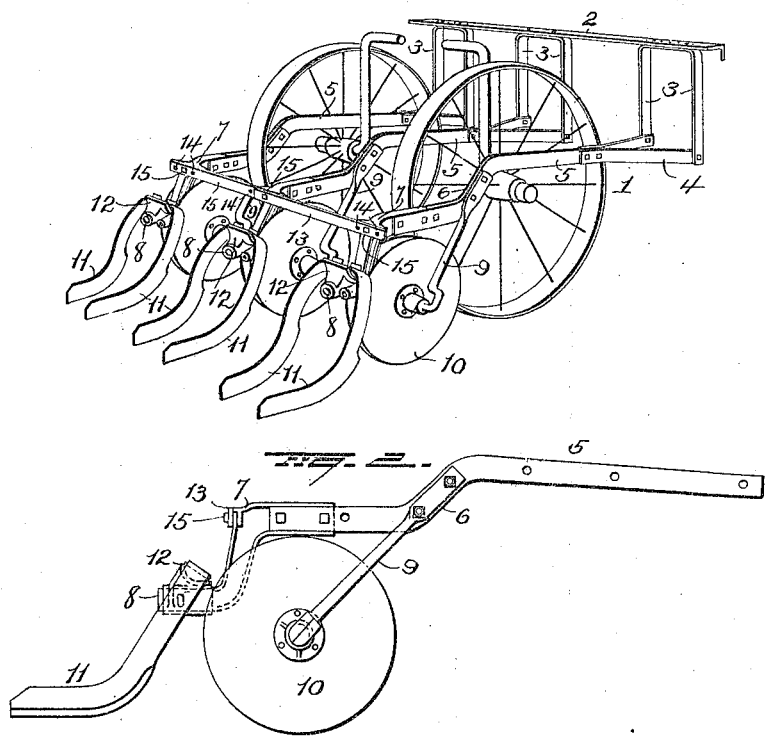

UNITED STATES PATENT OFFICE.

RUDOLPH J. ALTGELT, OF BUENOS AIRES, ARGENTINA, ASSIGNOR TO OLIVER CHILLED PLOW WORKS, OF SOUTH BEND, INDIANA.

PLANTER.

1,233,010. Specification of Letters Patent. Patented July 10, 1917.

Application filed February 26, 1915. Serial No. 10,788.

*To all whom it may concern:*

Be it known that I, RUDOLPH J. ALTGELT, a citizen of the United States, residing at Buenos Aires, Argentina, have invented certain new and useful Improvements in Planters; and I do hereby declare the following to be a full, clear, and exact description of the invention, such as will enable others skilled in the art to which it appertains to make and use the same.

This invention relates to improvements in planters, and consists in certain novel features of construction and combinations of parts as hereinafter set forth and pointed out in the claim.

In the accompanying drawings, Figure 1 is a perspective view illustrating an embodiment of my invention, and Fig. 2 is an enlarged view in side elevation showing one unit of the planter.

1 represents a wheeled frame, and from the forward cross bar 2 of this frame, pairs of hangers 3 are adjustably secured and depend therefrom. To the lower end of these hangers, coupling forks 4 are pivotally attached and constitute means for connecting the forward ends of beams 5 with the pairs of hangers.

The rear portion of each beam 5 is bent downwardly to form an inclined portion 6 and in rear of this inclined portion, a bracket 7 is rigidly secured,—said bracket projecting downwardly and rearwardly from its connection with the beam and provided at its lower end with an approximately horizontal, rearwardly projecting journal 8. Inclined arms 9 are secured at their upper ends to the beams 5 and at the lower ends of these arms, disk furrow-openers 10 are mounted.

Pairs of covering blades 11 are provided in rear of each furrow opener, and these blades are adjustably connected with the journals 8 of the brackets 7 through the medium of blocks 12.

The brackets 7 at the rear ends of the several beams 5 are connected by cross bars 13, the latter being provided near their end portions with such number of holes 14 for securing bolts 15, as will permit adjustment of the beams. The cross bars 13 are pivotally attached to the brackets 7 by means of the bolts 15 and serve to tie the several beams 5 together, so that during the operation of the planter, said beams may have some independent vertical movement, to permit the disks to accommodate themselves to the unevenness of the ground.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

The combination with a wheeled frame and a plurality of cultivator beams, of brackets secured to the rear ends of said beams, arms secured to said beams forwardly of said brackets, furrow openers carried by said arms, coverers adjustably secured to said brackets and projecting rearwardly therefrom, and tie bars connecting the brackets at the rear ends of the plurality of beams, said tie bars being pivotally and adjustably connected with said brackets.

In testimony whereof, I have signed this specification in the presence of two subscribing witnesses.

RUDOLPH J. ALTGELT.

Witnesses:
 ALFRED MOOG,
 G. BEHNKE.

Copies of this patent may be obtained for five cents each, by addressing the "Commissioner of Patents, Washington, D. C."